US010823865B2

(12) United States Patent
Berg

(10) Patent No.: US 10,823,865 B2
(45) Date of Patent: Nov. 3, 2020

(54) MULTI COMPONENT SENSOR DEVICE FOR POINT MEASUREMENTS ON THE SEABED DURING SEISMIC SURVEYS

(71) Applicant: 4CNode Geophysical AS, Haugesund (NO)

(72) Inventor: Eivind Wilhelm Berg, Haugesund (NO)

(73) Assignee: 4CNode Geophysical AS, Haugesund (NO)

(*) Notice: Subject to any disclaimer, the term of this patent is extended or adjusted under 35 U.S.C. 154(b) by 306 days.

(21) Appl. No.: 15/764,606

(22) PCT Filed: Oct. 10, 2016

(86) PCT No.: PCT/EP2016/074163
§ 371 (c)(1),
(2) Date: Mar. 29, 2018

(87) PCT Pub. No.: WO2017/063985
PCT Pub. Date: Apr. 20, 2017

(65) Prior Publication Data
US 2018/0275298 A1 Sep. 27, 2018

(30) Foreign Application Priority Data
Oct. 12, 2015 (NO) .................................... 20151370

(51) Int. Cl.
*G01V 1/00* (2006.01)
*G01V 1/16* (2006.01)
*G01V 1/38* (2006.01)
(52) U.S. Cl.
CPC ............ *G01V 1/162* (2013.01); *G01V 1/3817* (2013.01); *G01V 1/3835* (2013.01); *G01V 2210/1427* (2013.01)

(58) Field of Classification Search
USPC .......................................................... 367/149
See application file for complete search history.

(56) References Cited

U.S. PATENT DOCUMENTS 5,339,281 A   8/1994   Narendra et al.
6,474,254 B1  11/2002  Ambs et al.
(Continued)

FOREIGN PATENT DOCUMENTS

CN   103713326 A   4/2014
EP     1319964 A2   6/2003
(Continued)

OTHER PUBLICATIONS

English Machine Translation of CN 103713326 (Year: 2014).*
Breccia, Luca, "International Search Report," prepared for PCT/EP2016/074163, dated Dec. 22, 2016, four pages.

*Primary Examiner* — James R Hulka
(74) *Attorney, Agent, or Firm* — Shackelford, Bowen, McKinley & Norton, LLP

(57) ABSTRACT

The present invention relates to a seismic sensor node and corresponding measuring device for point measurements in seismic surveys of geological subsurface formations, where the sensor node includes a sensor housing with at least one movement sensor, the sensor node comprising a plate structure being adapted to be positioned into the sea bed, the sensor housing having a predetermined outer shape and the plate structure being adapted to receive and essentially enclose the sensor housing for providing acoustic coupling between the plate structure and the sensor housing, and the plate structure having a rotational symmetric structure with a vertical axis. The plate structure comprises a number of radially oriented plates secured together and being adapted to penetrate the sea bed with minimal displacement of the sea bed materials.

20 Claims, 4 Drawing Sheets

(56) References Cited

U.S. PATENT DOCUMENTS

Figure 1A:
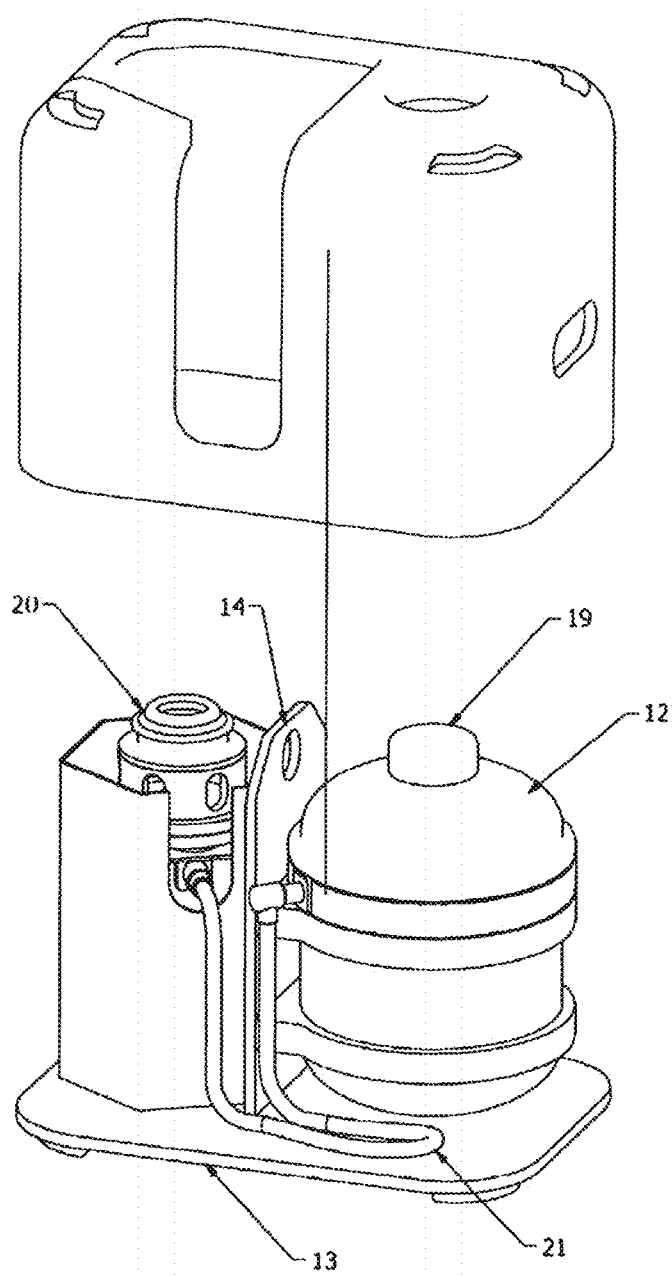

| | | | |
|---|---|---|---|
| 6,910,831 B2* | 6/2005 | Raines | B63B 21/29 |
| | | | 405/224.1 |
| 7,016,260 B2 | 3/2006 | Bary | |
| 7,224,641 B2* | 5/2007 | Nas | G01V 1/3852 |
| | | | 367/15 |
| 7,324,408 B2 | 1/2008 | Berg | |
| 10,514,473 B2* | 12/2019 | Naes | G01V 1/3852 |
| 2002/0110048 A1* | 8/2002 | Vandenbroucke | G01V 1/16 |
| | | | 367/24 |
| 2003/0117893 A1* | 6/2003 | Bary | G01V 1/3852 |
| | | | 367/16 |
| 2003/0167659 A1 | 9/2003 | Raines | |
| 2005/0105391 A1* | 5/2005 | Berg | G01V 1/16 |
| | | | 367/15 |
| 2006/0140053 A1 | 6/2006 | Nas | |

FOREIGN PATENT DOCUMENTS

| | | |
|---|---|---|
| NO | 20025831 A | 6/2003 |
| NO | 318314 B1 | 2/2005 |
| WO | WO-2004053526 A1 | 6/2004 |
| WO | WO-2012110785 A1 | 8/2012 |
| WO | WO-2013041838 A2 | 3/2013 |

* cited by examiner

MULTI COMPONENT SENSOR DEVICE FOR POINT MEASUREMENTS ON THE SEABED DURING SEISMIC SURVEYS

The present invention relates to a sensor device as specified in the preamble of claim 1, for receiving seismic waves reflected from geologic structures under the sea bottom, and where a number of sensor nodes are positioned in a pattern on the sea floor.

BACKGROUND

In order to be able to sample seismic pressure and especially shear waves, the sensor nodes have to be in contact with a solid medium. Offshore this means that one has to sample this kind of information at the sea floor in contact with the sediments on the sea floor. Shear waves or converted seismic waves have other characteristics than pressure waves and represent geological features and possible hydrocarbon content in reservoirs differently. In marine environments, the pressure waves are usually sampled by hydrophones positioned in hydrophone cables being towed after a vessel regularly exciting pressure waves using air gun arrays.

Shear waves and converted waves in marine situations are obtained by pressure waves generated by an air gun from a vessel at the sea surface. When the waves interact with the sea floor and different subsurface geological features under the sea floor a part of the pressure wave energy will be converted into reflected shear wave energy which may be sensed by sensor nodes containing accelerometers or geophones being embedded into the sea floor, as shear waves do not propagate through water the same way as through solid materials. For mapping of geological formations, the sensor nodes are positioned in regular patterns in large numbers so that the reflected pressure and shear waves together may provide an accurate image of the investigated geological layers. An image in this case means a geometrical three-dimensional representation giving information about the petrophysical properties of the geological reservoir formations and fluid content in the reservoirs.

Existing systems may generally be grouped in two types, i) OBS or individual sea floor seismometers and ii) multi component sea floor cables (OBC). OBS-units are dropped from the surface and sinks freely to the sea floor. The geophones may be positioned inside a glass sphere, but the hydrophones having to be in contact with the medium to detect the pressure waves are positioned outside. There may be a release mechanism to let the glass sphere with geophones as well as hydrophone, sampling electronics including sampled data, float to the surface. A metal frame will then remain on the sea floor. OBS is used for large scale deep geological mapping based on refraction seismic.

Multi component sea floor cables usually contain three component geophones and hydrophones being enclosed along a cable or in extensions from a cable. The cables are unwound or laid on the sea floor using dynamically positioned vessels on the surface. In some cases they are drawn along the sea floor. Collection of pressure or shear wave data is performed in the same way as with surface cables.

Norwegian patent NO318314 (Seabed Geophysical, 2002), corresponding to WO2004/053526, describes a known sensor device having a skirt shaped coupling part being driven into the sea bed. The mass of the sea floor sediments in the coupling skirt becomes part of the coupling mass, which makes the sensor lose some of the higher frequencies in the sampled data. When removing the sensor device the sea floor sediments in the coupling skirt will often remain so that it is difficult to put the sensor device back into the holder. In addition it is difficult to drive the coupling skirt down into the sea floor when the sea floor sediments is hard. US2006/140053 and WO2013/041838 show other solutions with skirts being partially driven down into the sea floor, and with the same disadvantages.

From U.S. Pat. No. 6,474,254 (Western Geco, 2002) a system and a method is known where a remote controlled vessel (ROV) is used to retrieve and take up data from deployed sensor nodes. The sensor nodes are formed as thickened parts of a cable being deployed on the sea floor. The connection between the different sensor nodes and sea floor will in this case be affected by the cable.

From Norwegian patent application 20025831 corresponding to U.S. Pat. No. 7,016,260 (Institut Francais du Petrole, 2003) it is known that a sensor node with a conical end may be dropped into the sea floor due to its weight. This creates considerable problems cause by packing of the sediments in the sea floor as well as a high center of gravity.

The object of the present invention is to provide a seismic measuring device combining the requirements for accurate and detailed registering of reflected seismic waves with measuring equipment being easily positioned on the sea floor. This is obtained with a device as described above and characterized as stated in the independent claim.

An additional object of the present invention is to provide a measuring device with a number of sensor elements being pushed into the sea bed sediments where the measurements are not affected by the enclosing control unit and which measures the correct vector response in all sensor elements at a given impact. The measuring device will be compact and have low weight, low center of gravity and maximum coupling surface to the sediments.

The invention will be described below with reference to the accompanying drawings illustrating the invention by way of examples.

FIG. 1a,b illustrates a split perspective drawing of the sensor device according to the invention with a sensor node being related to the control unit.

FIG. 2a-e illustrates a split perspective drawing of a sensor node according to a preferred embodiment of the invention.

Figure 3:
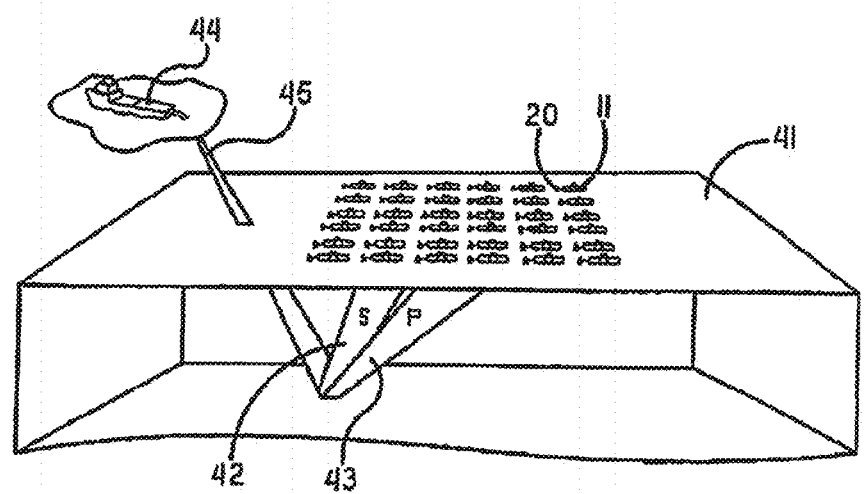

FIG. 3 illustrates a schematic perspective drawing showing the positioning of several sensor nodes in a regular pattern on the sea bed, and how the seismic wave generated at the surface is reflected by a geologic formation.

Figure 1B:
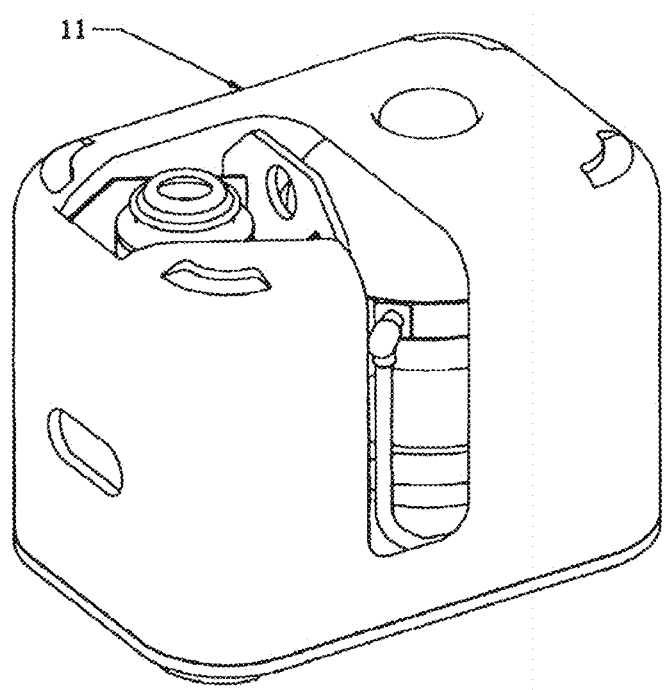

In FIGS. 1a and 1b a complete sensor node device 11 is shown with a separate, box shaped control unit 12 positioned on a frame 13 and being coupled to a grip and lift device 14 for operation by a remotely operated underwater vehicle (ROV) in the center of the top of the control unit. With this grip and lift device 14 the control unit 12 can be lowered down to the sea bed in predetermined positions.

The control unit 12 may contain power supply in addition to a computer with a storage medium, clock, telemetry system and batteries. Depending on the size and construction, one or more of these components may alternatively be positioned in the sensor housing 24 (FIG. 2a) which will be discussed below. It gives the possibility to continuously register seismic data with a certain sampling rate. Hydro acoustic communication facilitates sampling of control data from the stored seismic data in the storage medium. The transducer 19 is used for transferring data to the surface. Predetermined data is transmitted by telemetry and contains i) system data ii) seismic data to be processed further. System data may include information regarding battery status, storage volume and tilt meter data. In addition a positioning transducer 19 may also be used for increasing the positioning accuracy of the control unit 11 in that it is part of a positioning network (LBL) using other placed control units in the vicinity to find the relative position of the units. This use is especially attractive at large depths and may provide sub meter positioning accuracy.

The data transfer and quality control will usually be performed when the unit 11 has been retrieved to the surface.

FIG. 1a shows a sensor node 20 being connected to the control unit 12 over a flexible cable 21 that does not transmit mechanical vibrations and thus contributes to avoid disturbing signals from movements in the remaining parts of the equipment. The mechanical coupling over the cable to the remaining equipment may also affect the movements of the sensor node and thus the sensitivity. The coupling per se between the sensor node 20 and the control unit and housing is preferably also vibration damped in order to avoid disturbances. The sensor node 20 is preferably carried along with and positioned standing in one end of the control unit for placing on the sea bed and after retrieval from the sea bed.

Figure 2A:
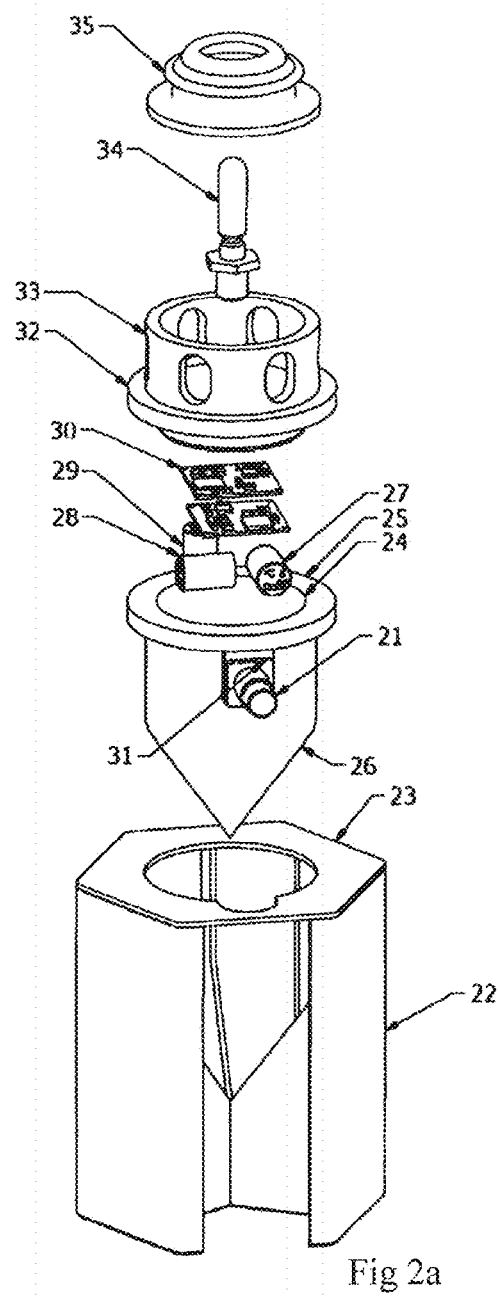
Figure 2B:
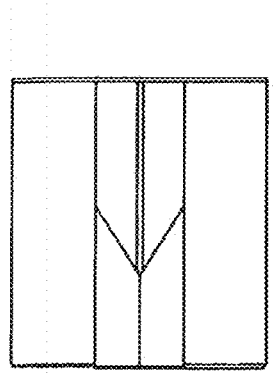
Figure 2C:
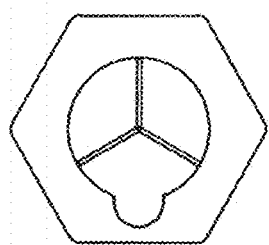
Figure 2D:
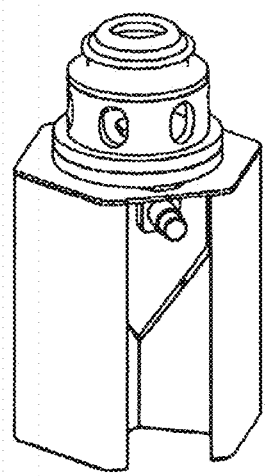
Figure 2E:
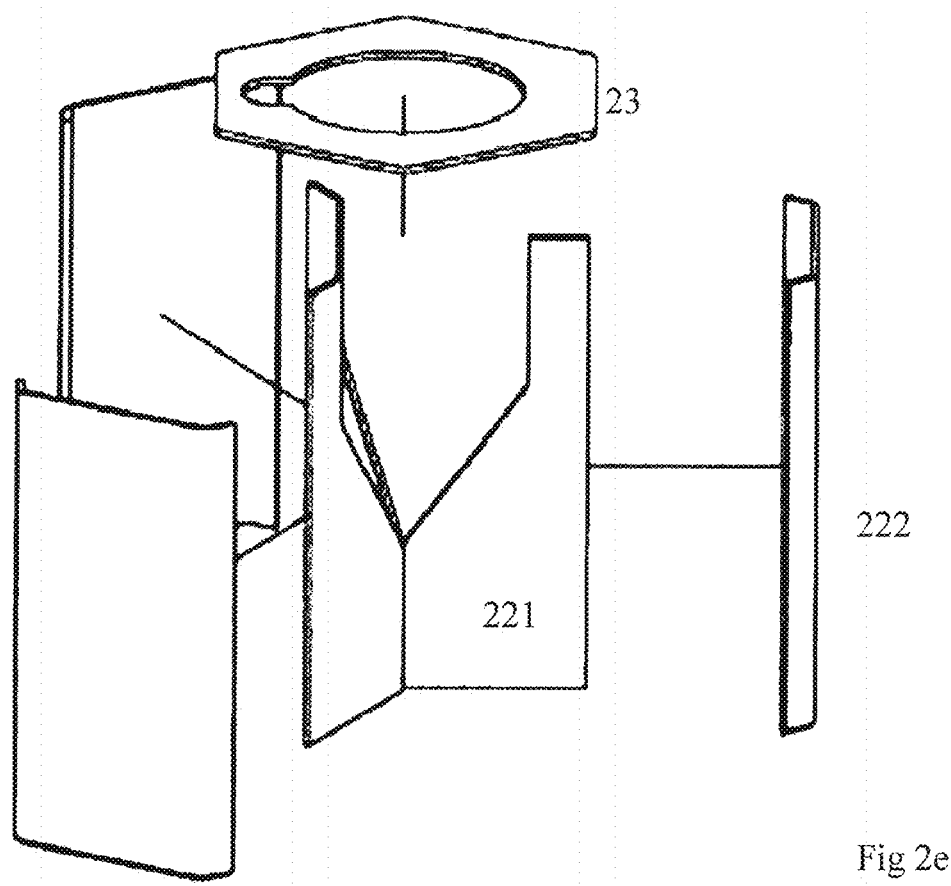

In FIG. 2a a more detailed example of a sensor node 20 is shown where it provides a sensor system. According to the preferred embodiment of the invention the sensor node includes a lower plate structure 22, being illustrated as seen from the side in FIG. 2b, from above in FIG. 2c and exploded view in FIG. 2e. As shown in FIG. 2e the plate structure according to the preferred embodiment of the invention consists of three radially oriented plates 221 fastened to each other having a 120 degrees angle relative to each other and outer, tangentially oriented plates 222 fastened to each radially oriented plate so as to provide three T-shaped vertical parts secured together in the centre having 120 degrees angle between them, thus providing a rotationally symmetric structure relative to the essentially vertical axis. In addition the node comprises a sensor housing with at least three sensors and a tilt meter measuring the tilt relative to the X and Y coordinates, a hydrophone and a grip element adapted to the ROV, as shown in FIG. 1a and further discussed below.

As described the preferred embodiment of the plate structure 22 includes, in the lower a triangular plate pattern of three T's. The tangential parts of the T's have a tangential extension creating a space between them and which in the circumference provides a hexagonal shape with openings as shown in the plate structure 22, in this case thus called the hexagon penetrator being pushed into the sea bed sediments with minimal displacement of the sea bed sediments. In the upper end a hexagonal plate 23 will reinforce the structure of the penetrating T's which have a maximum contact surface to the sediments. In the upper part the plate structure is shaped so as to receive the remaining parts of the sensor node, and especially the conical lower part 26 of the sensor housing 24, so as to obtain a maximum coupling between the hexagon penetrator and the rest of the node. The hexagon penetrator may be releasably connected to the rest of the node or fixed to it, depending on the situation and if it should be changed to comply with differences in the conditions on the sea floor.

The hexagon penetrator 22 in the figure with inner and outer symmetrical surfaces will give maximum contact surface against the sediments and will also provide a good coupling and the sensor node 20 will likewise not be sensitive to direction in relation to arriving seismic waves. The thin coupling surfaces in light metal make the introduction of the penetrator 22 into the sea floor with minimal changes in the sediments.

The cross section and length of the hexagon penetrator may vary depending on the conditions in the sea bed. Usually the cross section will be in the range of 100-200 mm and the length 100-200 mm. The wall thickness will typically be in the range of 3 mm. As the hexagon penetrator has three large openings water and excess sediments will escape easily. In the lower part of the horizontal hexagon top plate 23 a cable 21 lead through an opening between the outer coupling plates.

In the upper end of the hexagon penetrator 22 and under the hexagonal top plate a sensor housing 24 is fastened with a cylindrical shape and an upper flange 25 for a lid and a lower part, as well as in the lower part a conical tip 26. In other embodiments the hexagon top plate will necessarily have a shape adapted thereto. In the sensor housing 24 multi component sensors 27,28,29 such as geophones or accelerometers are contained oriented at 90 degrees relative to each other, and a circuit board 30 with electronic components and connectors. The sensor housing 24 has a fastening plate for the cable connection 31 with opening for throughput of the cable 21 beneath the top plate 23.

The circular lid 32 is joined with a cylindrical wall 33 having evenly distributed openings around it and contains on the inside the position of the hydrophone 34 which measures the pressure variations in the water, and thus the pressure waves in the seismic signal.

Over the cylindrical wall 33 a grip holds 35 is provided for an ROV. The sensor node 20 may thus be positioned near vertically into the sea bed using the ROV with a general arm tool or using specialized equipment therefore. The orientation/heading (compass direction) relative to the north providing a reference for the measuring instruments may be measured by the ROV. Depending on the size and available space the position transducer 19 may in an alternative embodiment be placed within the ring shaped grip hold 35.

The hexagon penetrator 22 may be planted into the sea bed so that the lower part of the sensor housing 24 with a conical tip 26 obtains good coupling with the surrounding sediments. The hexagon penetrator will make minimal changes in the sediments when introduced into the sediments as the shape displaces very little of the sediments. The hexagon penetrator 22 has low weight, the density preferably being chosen so as to correspond to the surrounding sediments and has a very low center of gravity thus being adapted to both soft as well as hard sea bed conditions and will provide a stable coupling of the sensor node even with lateral deviations in the sediments. The hexagon penetrator 22 with thin coupling surfaces and the conical tip 26 will provide good conditions for positioning in hard seabed. When retrieving and lifting the hexagon penetrator the sediments will easily fall off so that it is easy to put the hexagon penetrator back into the holder in the control unit 11. The hexagon penetrator coupling to the upper 10-20 cm of the sea bed sediments representing the sensor coupling to the sediments in the sea floor.

Even if the example used here to illustrate the invention is referred to as a hexagon penetrator with three plates for receiving the conical tip 26 of the instrument part of the sensor node other symmetrical solutions with more plates may also be used under certain conditions, as long as essentially uniform sensitivity is obtained in all directions. Too many plates will however displace too much of the sea bed sediments and will also be too heavy to allow for detection of small movements.

Also the opening in the hexagon penetrator has to be well adapted to the shape of the sensor housing and the preferably conical lower part 26 to obtain a good coupling between them. As with the number of plates the preferred shape of the sensor housing is essentially cylindrical with a lower conical part, but other shapes may also be used requiring adaptations in the penetrator construction.

In FIG. 3 an example is shown of an arrangement having several sensor devices in a grid pattern on the sea floor 41 where each sensor node 20 is connected to a control unit 11. With this type of configuration it is possible to provide a three dimensional image of the geological formations with pressure 43 and shear 42 wave reflections. The distance between the sensor nodes 20 may typically be 200-500 m. A seismic vessel 44 fires seismic pressure pulses 45 from given positions at the surface.

To summarize the present invention may be described as a seismic measuring device or sensor node for point measurements in seismic studies of geological subsurface formations. The sensor nodes are adapted to be positioned in the sea bed using a remote controlled vessel for collecting pressure and shear wave data reflected from the geological formations, as each sensor node (20) has at least three multicomponent sensors 27,28,29. The lower part of the plate structure preferably comprises a plate structure with three T-shaped plates welded together with 120 degrees from each other along a vertical center axis in the sensor node. The plate structure is adapted to extend almost without displacing any sediments into the sea bed, and where the upper part of the coupling plate structure includes a chamber or space under the a top plate 23 containing multi component sensors preferably measuring seismic events with correct vector response in all three dimensions 27,28,29. In some cases the number of measured dimensions may be reduces to one or two, e.g. depending on the properties to uncover in the geological reservoir formations.

More specifically the invention relates to a seismic sensor node for point measurements in seismic surveys of subsurface geological formations, where the sensor node 20 includes at least one motion sensor. The sensor node comprises a plate structure 22 being adapted to be positioned and possibly pushed into the sea bed, the sensor node having a predetermined outer shape and where the plate structure is adapted to receive and essentially enclose the sensor node to provide good acoustic/vibration coupling between them in the coupling plate structure. The plate structure 22 has an essentially rotationally symmetric structure consisting of plates fastened to each other along a vertical axis, adapted to essentially without minimal displacement of the sea bed sediments be positioned in the sea bed, and also have a direction invariant coupling of movements in the sea bed to the sensor node. Preferably, as described, each plate 221 includes a tangentially orientated additional plate 222 making a T shaped structure where the tangential plates have a distance between them.

The sensor node may include a sensor housing 24,26 for example containing multi component sensors such as geophones measuring seismic events with correct vector response in all three dimensions 27,28,29, where the multi component sensors are orientated at 90 degrees relative to each other, and a tilt meter. The sensor housing may also include a chamber with openings to the environment where the chamber contains a hydrophone 34, as well as additional components such as computer means or related storage medium, clock, and telemetry system as an alternative to be placed in the control unit 12, the control unit in this embodiment only containing power supply including batteries.

The sensor housing may have a conical lower part for being received in a correspondingly shaped recess in the plate structure and may be removable coupled to the plate structure. The plate structure according to the preferred embodiment of the invention is constituted by a three T shaped plate structure being welded together along the axis at 120 degrees between the T-s out from the vertical axis, thus providing an essentially 120 degrees rotation symmetrical structure. The size of the tangential parts of the T-shape is chosen so as to leave a distance between them, the cross section of the structure thus having a hexagonal shape so as to an essentially direction invariant coupling to the sea floor.

The sensor node may be placed in a measuring device 11 and may also comprise a control unit 12 including power supply and storage means for receipt and storage of sampled seismic data from the sensor node, as well as containing a remotely controlled registering and reporting device for telemetric data transfer to a control central positioned at the surface. The sensor node is preferably connected to the control unit over a flexible cable 21 being lead into the sensor node 20 through the chamber 24 under the top plate 23.

The invention claimed is:

1. A seismic sensor node for point measurements in seismic surveys of geological subsurface formations, the seismic sensor node comprising:
    a sensor housing with at least one movement sensor, the sensor node comprising a plate structure being adapted to be positioned into the sea bed, the sensor housing having a predetermined outer shape and the plate structure being adapted to receive and enclose the sensor housing for providing acoustic coupling between the plate structure and the sensor housing, and the plate structure having a rotational symmetric structure with a vertical axis; and
    wherein the plate structure comprises a number of radially oriented plates secured together and being adapted to penetrate the sea bed so as to minimize displacement of the sea bed materials.

2. The seismic sensor node according to claim 1, wherein each of the plates being secured together in their radially outer ends are fastened to tangentially oriented vertical plate parts each providing a T-shaped plate structure.

3. The seismic sensor node according to claim 2, wherein the plate structure is constituted by three T-shaped plate structures welded together at the center axis with 120 degrees between them, the tangential plate parts being separated from each other, the plate structure thus providing a hexagonal horizontal cross section.

4. The seismic sensor node according to claim 1, wherein the sensor housing is releasably connected to the plate structure.

5. The seismic sensor node according to claim 1, wherein the sensor housing has a conically shaped lower side for being received in a similarly shaped space in the plate structure.

6. The seismic sensor node according to claim 1, wherein the sensor housing comprises a chamber including multi component sensors measuring the seismic events with correct vector response in all three dimensions.

7. The seismic sensor node according to claim 6, wherein the multi component sensors include three directional sensors oriented at 90 degrees relative to each other, and a tilt meter.

8. The seismic sensor node according to claim 6, wherein the sensor housing also includes a chamber with openings to the surroundings and containing a hydrophone.

9. The seismic sensor node according to claim 1, wherein the top of the sensor node is provided with a grip part adapted to interact with an ROV or a special tool.

10. A seismic measuring device comprising:
   at least one sensor node according to claim 1; and
   a control unit including a power supply and a storage means for receipt and storing of sampled seismic data from the sensor node, as well as comprising a remote controlled registration and reporting unit for telemetric data communication to a control center at the surface.

11. The seismic measuring device according to claim 10, wherein the sensor node is connected to the control unit through a flexible cable lead into the sensor node through the space under a hexagonal top plate positioned on the plate structure.

12. The seismic measuring device according to claim 10, comprising a positioning transducer connected to a positioning network.

13. The seismic measuring device according to claim 12, wherein the positioning transducer is mounted on the sensor unit.

14. The seismic measuring device according to claim 12, wherein the positioning transducer is mounted on the sensor node.

15. The seismic measuring device according to claim 10, wherein the control unit is positioned separately from the sensor node and includes a power supply in addition to at least one of the following components: a storage medium, a clock, and a telemetry system.

16. The seismic measuring device according to claim 10, wherein circuitry for at least one of the following components is positioned in the sensor housing:
   a storage medium;
   a clock;
   and a telemetry system.

17. A seismic sensor node for point measurements in seismic surveys of geological subsurface formations, the seismic sensor node comprising:
   a sensor housing with at least one movement sensor, the sensor node comprising a plate structure being adapted to be positioned into the sea bed, the sensor housing having a predetermined outer shape and the plate structure being adapted to receive and enclose the sensor housing for providing acoustic coupling between the plate structure and the sensor housing, and the plate structure having a rotational symmetric structure with a vertical axis; and
   wherein the plate structure comprises a number of radially oriented plates secured together and being adapted to penetrate the sea bed so as to minimize displacement of the sea bed materials, wherein each of the plates being secured together in their radially outer ends are fastened to tangentially oriented vertical plate parts each providing a T-shaped plate structure, and
   wherein the plate structure is constituted by at least three T-shaped plate structures welded together at the center axis, the tangential plate parts being separated from each other and symmetrically positioned around the axis.

18. The seismic sensor node according to claim 17, wherein the plate structure is constituted by three T-shaped plate structures welded together at the center axis with 120 degrees between them, the plate structure thus providing a hexagonal horizontal cross section.

19. The seismic sensor node according to claim 17, wherein the plate structure has a density being chosen so as to correspond to the surrounding sediments.

20. A seismic measuring device comprising:
   at least one sensor node positioned therein for point measurements in seismic surveys of geological subsurface formations, the sensor node including a sensor housing with at least one movement sensor, the sensor node comprising a plate structure being adapted to be positioned into the sea bed, the sensor housing having a predetermined outer shape and the plate structure being adapted to receive and enclose the sensor housing for providing acoustic coupling between the plate structure and the sensor housing, and the plate structure having a rotational symmetric structure with a vertical axis;
   wherein the plate structure comprises a number of radially oriented plates secured together and being adapted to penetrate the sea bed so as to minimize displacement of the sea bed materials;
   wherein a coupling between the sensor node and the measuring device is vibration damped; and
   a control unit including a power supply and a storage means for receipt and storing of sampled seismic data from the sensor node, as well as comprising a remote controlled registration and reporting unit for telemetric data communication to a control center at the surface.

* * * * *